United States Patent [19]
Clark

[11] 3,720,286
[45] March 13, 1973

[54] WEIGHING AND DELIVERY APPARATUS WITH INITIAL VOLUMETRIC DOSE AND DRIBBLE FEED

[75] Inventor: David P. Clark, Columbus, Ohio

[73] Assignee: The Exact Weight Scale Company, Inc., Columbus, Ohio

[22] Filed: March 2, 1972

[21] Appl. No.: 231,259

[52] U.S. Cl................................177/81, 177/122
[51] Int. Cl..............................................G01g 13/04
[58] Field of Search ..177/81, 105, 114, 122; 222/55, 222/71

[56] References Cited

UNITED STATES PATENTS 548,844  10/1895  Richards................................177/122

FOREIGN PATENTS OR APPLICATIONS 892,685  7/1949  Germany................................177/122

Primary Examiner—George H. Miller, Jr.
Attorney—Francis T. Kremblas, Jr.

[57] ABSTRACT

An apparatus for successive delivery of bulk material characterized by a novel feed chute construction which incorporates a fine feed flow control baffle associated with the rapid delivery of a bulk amount of material. The baffle plate is situated in the feed chute to define an initial bulk delivery volume which is delivered at a fast rate and which is followed immediately by a finer rate of flow as controlled by the restriction in the chute formed by the baffle plate and the inner wall of the chute.

5 Claims, 4 Drawing Figures

WEIGHING AND DELIVERY APPARATUS WITH INITIAL VOLUMETRIC DOSE AND DRIBBLE FEED

BACKGROUND OF INVENTION

The present invention relates generally to the field of batch weighing and particularly to apparatus for successively delivering a given quantity of material to individual containers.

There are a variety of applications wherein a given weight of material is desired to be fed into individual containers in rapid mass production fashion. The delivery of a given quantity of sugar, flour, candy or the like in 1, 2 or 5 pound amounts represents typical examples. In this type of application speed within a given degree of accuracy is essential to maintain economical production rates.

Presently, the typical prior art system utilizes a bulk feed and a fine or trim feed. The bulk feed delivers a given amount to a weighing hopper which falls several ounces short of the desired unit weight to be delivered.

The typical approach is then to use the well-known vibratory trim feed to dribble the last portion into the weighing hopper which automatically closes the fine feed gate upon achieving the desired end amount of material.

The problem with this prior art approach is simply that the control of the bulk feed amount is not accurate enough to permit the rapidly delivered initial bulk amount to approach the final desired unit amount very closely. Therefore, the trim feeding apparatus must deliver too much material at its relatively slow rate. This adds a substantial amount of time to each unit delivery.

This delay, which heretofore has been necessary to achieve the necessary level of accuracy represents a great reduction of production rates and has been a longstanding, unsolved problem in this field.

SUMMARY OF INVENTION

The present invention represents a relatively simple and reliable solution to the long unsolved problem of unit delivery of bulk goods and comprises an efficient, inexpensive construction which provides for lessening the feed time for unit quantity delivery.

The apparatus of the present invention comprises an improvement of the conventional apparatus and includes a novel chute construction wherein an adjustable baffle plate is disposed within the delivery chute to provide a fine feed control subsequent to the bulk feed delivery. The baffle plate is disposed at a predetermined distance upstream from the chute outlet to define a given volume of material which constitutes the desired rapid bulk delivery.

Upon discharge of this initial bulk quantity, the flow of material disposed upstream of the baffle plate is controlled by the restriction formed between the baffle plate and the wall of the chute.

Therefore this medium fine feed rate permits a more accurate approach toward the delivery of the desired quantity of a given unit discharge at a relatively fast rate. Conventional controls actuated by the weighing hopper dictate the closing of the outlet valve on the chute upon reaching a given quantity.

Depending upon the required accuracy and the specifics of a given application, a conventional vibratory trim feeder may be employed to deliver the final amount of material, however, the controlled automatic fine feed greatly reduces the amount of the trim feed necessary and in certain applications makes it unnecessary. Therefore, a more rapid delivery of each unit amount is obtained without sacrificing the desired accuracy.

OBJECTS

It is primary object of the present invention to provide an improved successive bulk delivery apparatus wherein the delivery time of each unit discharge is substantially reduced with no substantial reduction of accuracy.

It is another object of the present invention to provide an apparatus of the type described wherein a relatively simple and improved construction is possible to achieve greater productivity as compared to prior art apparatus.

It is another object of the present invention to provide an apparatus of the type described wherein an improved construction not only achieves a higher production rate, but in addition, initial manufacturing costs may be reduced as compared to prior art apparatus.

DETAILED DESCRIPTION OF THE DRAWINGS

Figure 1:
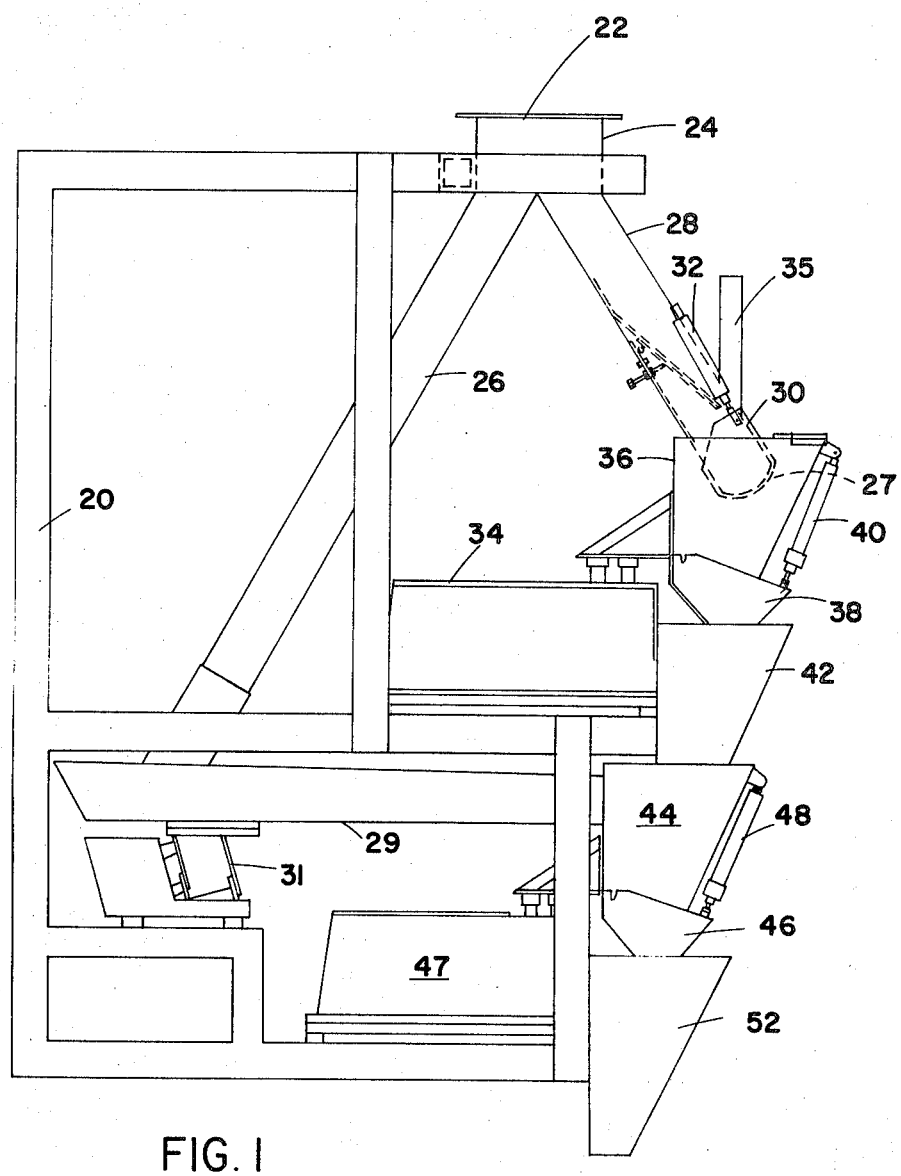
FIG. 1 is a side elevational view of a typical successive bulk feed and weighing apparatus constructed in accordance with the present invention.
Figure 2:
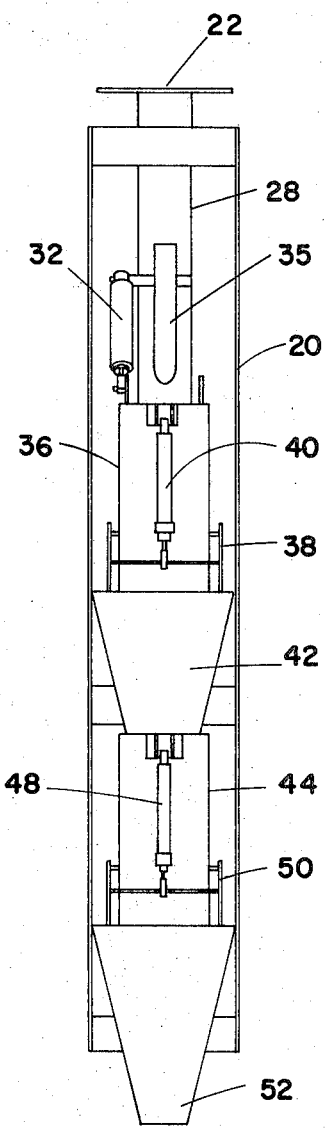
FIG. 2 is a front elevational view of the apparatus shown in FIG. 1.

Referring specifically to the drawings, a delivery and weighing apparatus for bulk materials constructed in accordance with the present invention is illustrated in FIG. 1 and includes a supporting frame means 20.

An inlet opening 22 of a chute means, indicated generally at 24, is adapted to communicate with a storage hopper or the like, not shown, which provides a source of the bulk material to be delivered.

Chute means 24 is conventionally connected to frame means 20 and includes a pair of diverging legs 26 and 28. Leg 26 communicates with a standard vibratory feeder 29 which may be eliminated in certain applications without departing from the spirit of the present invention.

Leg 28 of chute means 25 is provided with an outlet 27 at its lower end which is opened or closed by a clamshell valve 30. Valve 30 is operatively connected to a power cylinder 32 which in turn is actuated automatically by a signal initiated by automatic weighing scale 34. An air vent 35 is provided in leg 28 to prevent air pressure from building up within the chute.

A conventional weighing hopper 36 is disposed to receive the discharged material from chute leg 28. Hopper 36 is operatively connected to the conventional scale 34, which may be for example, model 1262N as manufactured by The Exact Weight Scale Co. of Columbus, Ohio.

Hopper 36 is provided with a valve means 38 controlled by actuation of power cylinder 40.

Below hopper 36 is disposed a delivery hopper 42 which is fastened to the side of scale 34 and functions to communicate hopper 36 with a final weighing hopper 44 which in turn is operatively connected to another weighing scale 47 in a conventional manner.

Hopper 44 also communicates with the vibratory trim feeder 29 which in the conventional manner includes vibrating means 31. A valve means 48, operated by a power cylinder 50, is mounted on hopper 44 and operates in the same manner as the other hopper 36.

Another delivery hopper 52 is disposed below hopper 44 to communicate its contents to a unit container to be filled, not shown.

Scale 47 is also conventional and may be the same general type as scale 34.

Figure 3:
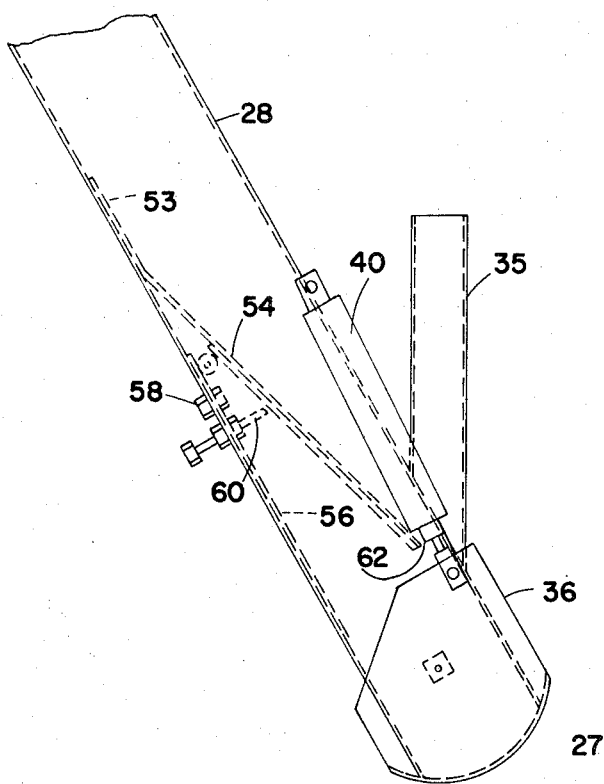
FIG. 3 is a partial side elevational view of the delivery chute and fine feed control comprising a portion of the apparatus shown in FIG. 1.
Figure 4:
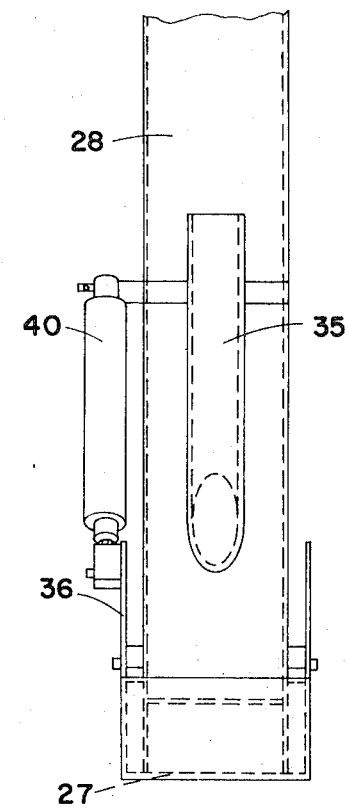
FIG. 4 is a front elevational view of that portion of the apparatus shown in FIG. 3.

Now referring specifically to FIGS. 3 and 4, the novel automatic fine feed control of the present invention is clearly shown and includes a baffle plate 54 connected to an adjustable plate 56 which in turn is mounted on the inside wall of chute leg 28 by nut and bolt assembly 58.

A feeding rate adjustment means is provided in the form of threaded bolt and nut assembly 60. The inner end of bolt 60 engages baffle plate 54 to permit movement of plate 54 to adjust the angle thereof which controls the opening 62 between the end of plate 54 and the opposite inner wall of chute leg 28.

The volume within leg 28 between the outlet 27 and the area below baffle plate 54 define the bulk rapid feed volume. This volume may be adjusted by movement of the plate 56 upwardly or downwardly within chute leg 28. Once positioned as desired, nut and bolt assembly 58 is fastened to hold plate 56 and baffle plate 54 in the desired position.

The upper end 53 of plate 54 is preferably flexible or resilient in order to maintain a contact with the inner wall of leg 28 when the angle of plate 54 is changed. This provides a seal to separate the upper portion of leg 28 from the lower portion thereof which forms the bulk rapid feed volume.

From the foregoing description, it should be apparent that an initial given volume may be delivered rapidly to weighing hopper 30 and immediately a finer rate of feed follows through opening 62 which is controlled by the angle of baffle plate 54. The rate, of course, of this finer feed may be adjusted by the size of opening 62. Applications which call for a lesser degree of accuracy may not need the supplemental vibratory trim feeder.

The use of this construction does permit a much more rapid delivery of a fine feed rate than the conventional vibratory trim feed apparatus and, of course, a much more accurate delivery relative to the initial bulk amount. Therefore it should be clear that utilizing the construction of the present invention permits a much more rapid delivery as compared to conventional apparatus while utilizing a comparably much less expensive and simple construction.

In applications wherein the level of accuracy deems a conventional vibratory trim feed necessary, the utilization of the fine feed control substantially reduces the amount of material that heretofore was necessarily delivered at the slow rate of a vibratory trim feeder. Hence the time saved represents a substantial increase in production rates.

Further, if desired, the vibratory trim feeder could be arranged to feed directly into the upper weighing hopper 36 and the lower scale and weighing hopper could be eliminated.

What is claimed is

1. In an apparatus for successive delivery of a given amount of material the combination of a feed chute communicating with a source of material and including an outlet communicaTing with a weighing hopper; an outlet valve associated with said outlet and automatically operable between open and closed positions responsive to a given weight of material in said weighing hopper; means defining a restriction disposed within said chute a predetermined distance upstream from said outlet to define a bulk delivery volume for a given bulk amount of each delivered amount of material, said means defining a restriction controlling the flow rate of a predetermined amount of the material to be delivered to the hopper after the bulk volume amount is delivered.

2. The apparatus defined in claim 1 wherein said means defining a restriction comprises a baffle plate attached at one end to an inner wall of said chute, the opposite end of said plate being disposed near but spaced from the opposite inner wall of said chute.

3. An apparatus for successively feeding a predetermined weight of material into containers comprising in combination, a chute communicating with a supply of material and including an outlet; valve means associated with said outlet and automatically operable between open and closed positions related to the amount of material to be dispatched through said outlet; flow control means disposed within said chute a predetermined distance upstream from said chute outlet, the area between said flow control means and said outlet defining a bulk storage volume within said chute for an amount of material less than the predetermined amount desired to be fed into a single container, another portion of said predetermined amount being fed at a slower rate through said outlet than the initial bulk material contained in said bulk storage volume as controlled by said flow control means.

4. The apparatus defined in claim 3 including a fine trim feeding means communicating with said supply of material and to each of said containers for automatic delivery of the final portion of said predetermined desired amount.

5. The apparatus defined in claim 3 wherein said flow control means comprises a baffle plate disposed at a predetermined distance upstream of said chute outlet and which defines a restriction in said chute to control the rate of flow of material.

* * * * *